United States Patent
Fischer (10) Patent No.: US 7,906,924 B2
(45) Date of Patent: Mar. 15, 2011

(54) WIDE DYNAMIC RANGE MOTOR CONTROL SYSTEM AND METHOD

(75) Inventor: James C. Fischer, Fountain Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 625 days.

(21) Appl. No.: 12/017,163

(22) Filed: Jan. 21, 2008

(65) Prior Publication Data

US 2010/0283418 A1 Nov. 11, 2010

(51) Int. Cl.
*H02P 23/14* (2006.01)

(52) U.S. Cl. .......... 318/400.14; 318/400.05; 318/400.07; 318/400.23; 318/400.15; 323/212; 323/237; 323/204

(58) Field of Classification Search ............. 318/400.14, 318/400.05, 400.07, 400.23, 400.15; 323/212, 323/237, 204

See application file for complete search history.

(56) References Cited

U.S. PATENT DOCUMENTS

| | | | | |
|---|---|---|---|---|
| 4,019,105 | A * | 4/1977 | Cornell et al. | 318/803 |
| 4,115,726 | A * | 9/1978 | Patterson et al. | 318/722 |
| 4,163,928 | A * | 8/1979 | Patterson et al. | 318/573 |
| 4,868,477 | A * | 9/1989 | Anderson et al. | 318/696 |
| 4,991,429 | A * | 2/1991 | Stacey et al. | 73/114.59 |
| 5,334,923 | A * | 8/1994 | Lorenz et al. | 318/805 |
| 5,616,999 | A * | 4/1997 | Matsumura et al. | 318/632 |
| 6,002,226 | A * | 12/1999 | Collier-Hallman et al. | 318/400.23 |
| 6,362,586 | B1 * | 3/2002 | Naidu | 318/432 |
| 6,392,418 | B1 * | 5/2002 | Mir et al. | 324/503 |
| 7,042,227 | B2 * | 5/2006 | Mir et al. | 324/503 |
| 7,088,067 | B2 * | 8/2006 | Yamamoto et al. | 318/400.34 |
| 7,579,800 | B2 * | 8/2009 | Kitano | 318/432 |
| 2009/0200974 | A1 * | 8/2009 | Yasui | 318/400.33 |

* cited by examiner

*Primary Examiner* — Rita Leykin

(74) *Attorney, Agent, or Firm* — Ingrassia Fisher & Lorenz, P.C.

(57) ABSTRACT

Methods and systems are provided for controlling a discretely commutated, multi-phase DC electric motor or actuator is used. The methods and systems may be used for motor or actuator applications where accurate, high resolution torques may be need over a relatively wide range. The methods and systems provide alternative means of selecting the magnitudes of currents to be driven into the motor windings.

20 Claims, 6 Drawing Sheets

WIDE DYNAMIC RANGE MOTOR CONTROL SYSTEM AND METHOD

STATEMENT REGARDING FEDERALLY SPONSORED RESEARCH OR DEVELOPMENT

This invention was made with Government support under Agreement No. HQ0006-04-C-0004 with the Missile Defense Agency. The Government has certain rights in this invention.

FIELD OF THE INVENTION

The present invention generally relates to controlling actuators and/or motors and, more particularly, relates to systems and methods for controlling motor driven actuators and/or motors over a wide and dynamic range of output torques.

BACKGROUND OF THE INVENTION

Motors and actuators are used in myriad applications. The system requirements for many of these applications are requiring ever-wider dynamic output torque ranges, while maintaining sufficient resolution. For example application is for missile guidance systems, where one or more multi-phase electric motors or actuators are used to control a thruster nozzle, which controls where the missile goes. More specifically, the motors supply output torques to hold the nozzle in place or to reposition the nozzle, in order to hold or change, respectively, the course of the missile. Over the duration of a missile flight, the motors or actuators may need to produce output torques that dynamically vary over a relatively wide range.

The agility of a missile, which is defined as its ability to avoid obstacles and make last minute adjustments for target acquisition, is controlled by its dynamic, high torque capabilities. High resolution torque requirements are necessary for stability, fine pointing, and compensation for minor disturbances due to weather. Thus, the wider the torque range, the more agile the missile; however, the resolution needs to be maintained to control the stability.

A motor produces output torque by having current driven through its windings. As is generally known, the torque produced by each motor winding at any given time is the product of the current supplied to the winding and the torque constant of the winding for the winding position at that time. The sum of each of the individual winding torques is the motor output torque.

Because motor current is an analog parameter, many heritage motor drive control systems were analog-based systems. Even though digital electronics can be used to control analog parameters such as motor current, digital motor drive control systems, at least until recently, were not significantly utilized. One reason for this is because processors did not possess sufficiently fast processing speed capability to handle multiple motor winding current loops. Also, previously known digital motor drive control systems paid a relatively large power and/or weight penalty as compared to the analog-based systems that performed the same function. More recent digital motor drive control systems have the speed and processing capability to handle multiple current loops. These digital systems also have the processing capability to allow multiple signals (acceleration, speed, rate and position) to be derived from a single detector, thereby reducing the number of mechanical components. This latter factor helps to balance, or perhaps tip, the scales in the area of weight.

It was previously noted that, at least for some applications, it is desirable to widen the torque range of a motor, while at least maintaining sufficient resolution. Two methods have been identified to achieve this goal. One of the identified methods is to use two motors scaled to operate over different torque ranges and with their performances meshed together, the other identified method is to reduce the ground floor noise. With regard to the two motor method, including additional motors in a system can adversely impact weight and cost, especially in airborne environments such as missiles and other projectiles.

As to the method of reducing ground floor noise, significant progress has been made. In an analog motor drive control system, resolution is generally defined as the level of ground floor noise. Heritage analog motor drive control systems typically operate off of ±12 VDC or ±15 VDC secondary power sources. Thus, the normal operating range for these systems is in the range of about +10V to −10V. A typical system with a range of +10V to −10V and a ground floor noise of 5 ma has about 12-bits of resolution. The ground floor noise in some analog motor drive control systems has been pushed down to 1 ma, which is equivalent to 14-bit resolution, and some analog motor drive control systems have pushed the ground floor noise down to 0.3 ma, which equivalent to 16-bits of resolution.

With regard to digital motor drive control systems, the simplest of these systems presently have 16-bits of resolution, although some systems have 32-bits of resolution, and others even have 64-bits of resolution. Of course, in these digital motor drive control systems the digital signals have to be converted to analog signals, and analog feedback signals have to be converted to digital signals. However, most digital-to-analog (D/A) converters and analog-to-digital (A/D) converters have resolutions limited to a range of 12-bits to 16-bits. Thus, resolutions greater that 16-bits may not be achievable even in digital motor drive control systems.

Accordingly, it is desirable to provide a method and system for controlling a single multi-phase motor or multi-phase motor driven actuator that increases the control resolution allowing for a wider torque output range. Additionally, it is desirable to provide a method and system for controlling a motor or actuator that increases the control resolution while minimizing torque ripple. Furthermore, other desirable features and characteristics of the present invention will become apparent from the subsequent detailed description of the invention and the appended claims, taken in conjunction with the accompanying drawings and this background of the invention.

BRIEF SUMMARY

Systems and methods are provided for controlling a multi-phase electric motor or actuator. In one embodiment, and by way of example only, a method for controlling the torque produced by a multi-phase DC motor, in which each phase of the multi-phase DC motor includes a phase winding having a torque constant, includes the step of determining a drive current to be supplied to each phase winding to produce a desired torque magnitude, where the determined drive currents each include a peak amplitude and a phase angle. The drive current is supplied to each phase winding, and the phase angle of each drive current is at least selectively varied to produce the desired torque magnitude.

In another embodiment, a motor drive control system includes a multi-phase DC motor and a controller. Each phase of the multi-phase DC motor includes a phase winding having a torque constant, and the multi-phase DC motor is responsive to a drive current supplied to each phase winding to produce a torque. The controller is adapted to receive a torque command representative of a desired torque magnitude to be produced by the multi-phase DC motor. The controller is responsive to the torque command to determine a winding current command for each phase winding that is representative of the drive current to supply to each phase winding to produce the desired torque magnitude, wherein each drive current including a peak amplitude and a phase angle. The winding current command for each phase winding also at least selectively varies the phase angle of the drive current to supply to each phase winding to produce the desired torque magnitude.

BRIEF DESCRIPTION OF THE DRAWINGS

The present invention will hereinafter be described in conjunction with the following drawing figures, wherein like numerals denote like elements, and wherein.

DETAILED DESCRIPTION

The detailed description of the invention that is provided herein is merely exemplary in nature and is not intended to limit the invention or the application and uses of the invention. Furthermore, there is no intention to be bound by any theory presented in the preceding background or the following detailed description.

Systems and methods are provided for controlling a multi-phase electric motor (e.g., a discretely commutated DC motor). In general, the function of the electric motor is to produce a relatively precise output torque with relatively high resolution and over a relatively wide dynamic range. The precision output torque may be used to have the motor maintain its position to counter external forces, to quickly and smoothly move to a new position, to hold a constant rate of rotation, to smoothly accelerate or decelerate, or any one of numerous combinations thereof.

The discretely commutated DC motors described herein have their motor windings wound such that the torque constant of each winding is a function of the motor position. Typically, the torque constant varies sinusoidally at several cycles per mechanical revolution of the motor. It is noted that one cycle of the sinusoidally varying torque constant may be referred to as an electrical cycle. In a multi-phase motor, the only difference in the torque constants is that the torque constants of each phase are phase shifted relative to each other. For example, in a two-phase motor, the torque constants of each phase are shifted by 90 electrical degrees. Similarly, in a three-phase motor, the torque constants of each phase are phase shifted by 120 electrical degrees.

Before describing exemplary embodiments of the present invention, a brief discussion of known motor drive control systems (referred to herein as heritage motor drive control systems) and the control algorithms these heritage motor drive control systems implement will first be provided.

Figure 1:
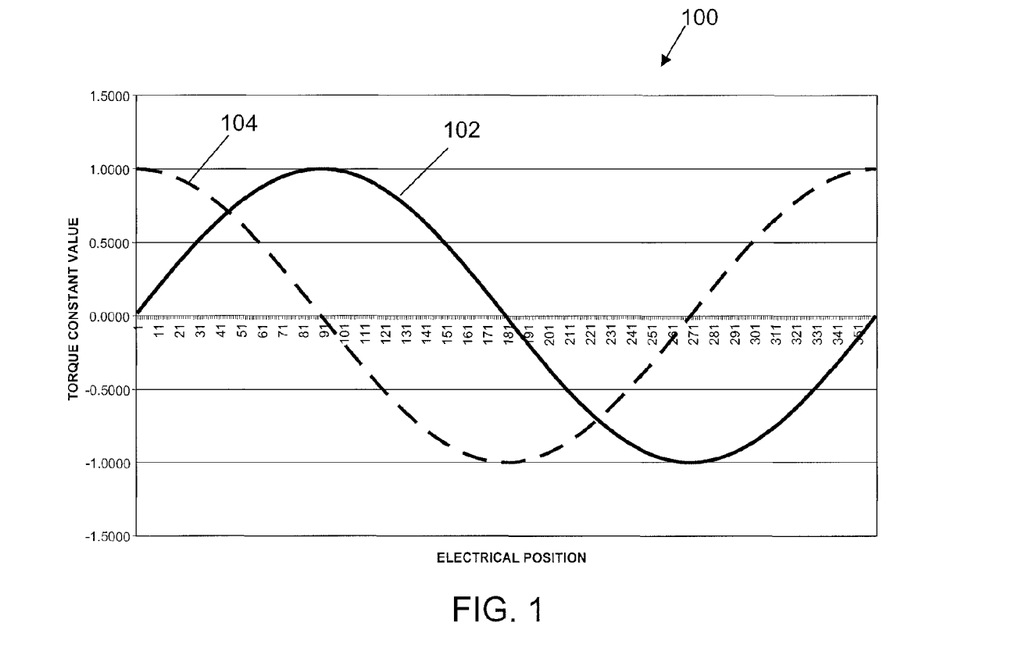
FIG. 1 is a plot depicting winding torque constants as a function of electrical position for a two winding, continuously commutated DC motor.

Heritage motor drive control systems that implement precise, low ripple motor drives calculate and supply the multi-phase motor windings as a function of motor position. All of the windings are driven with equal peak current magnitude, and with the winding current phases aligned with the associated winding torque constant. This results in an output torque (T) that is proportional to the product of the peak winding current magnitudes (I) and the winding torque constant (K). Moreover, heritage motor drive control systems that require accurate motor torques use two-phase sinusoidally wound motors, and thus include a sine winding and a cosine winding. The sine winding torque constant and the cosine winding torque constants are mathematically described by equations (1) and (2), respectively:

$$K(\text{sine}) = K*\text{Sin}(AX) \qquad (EQ\text{-}1)$$

$$K(\text{cosine}) = K*\text{Cos}(AX), \qquad (EQ\text{-}2)$$

where K is the winding torque constant, A is the number of electrical cycles per mechanical revolution, and X is the mechanical angle between the motor rotor and stator. To more clearly illustrate the variation in winding torque constant, FIG. 1 depicts the sine winding torque constant 102 and the cosine winding torque constant 104 as a function of electrical position. It is noted that in the graphical depiction of FIG. 1, the torque constants are normalized (e.g., K=1), and the number of electrical cycles to mechanical cycles have been set to one (e.g., A=1).

Heritage motor drive control systems that implement accurate motor torques supply sinusoidal winding currents to drive each of the motor windings. The winding currents (I) that are supplied to each phase winding are proportional to the desired output torque. Thus, the sine winding current (e.g., I(sine)) and the cosine winding current (e.g., I(cosine)) are mathematically described by equations (3) and (4), respectively:

$$I(\text{sine}) = I^* \text{Sin}(AX) \qquad \text{EQ-3}$$

$$I(\text{cosine}) = I^* \text{Cos}(AX). \qquad \text{EQ-4}$$

Figure 2:
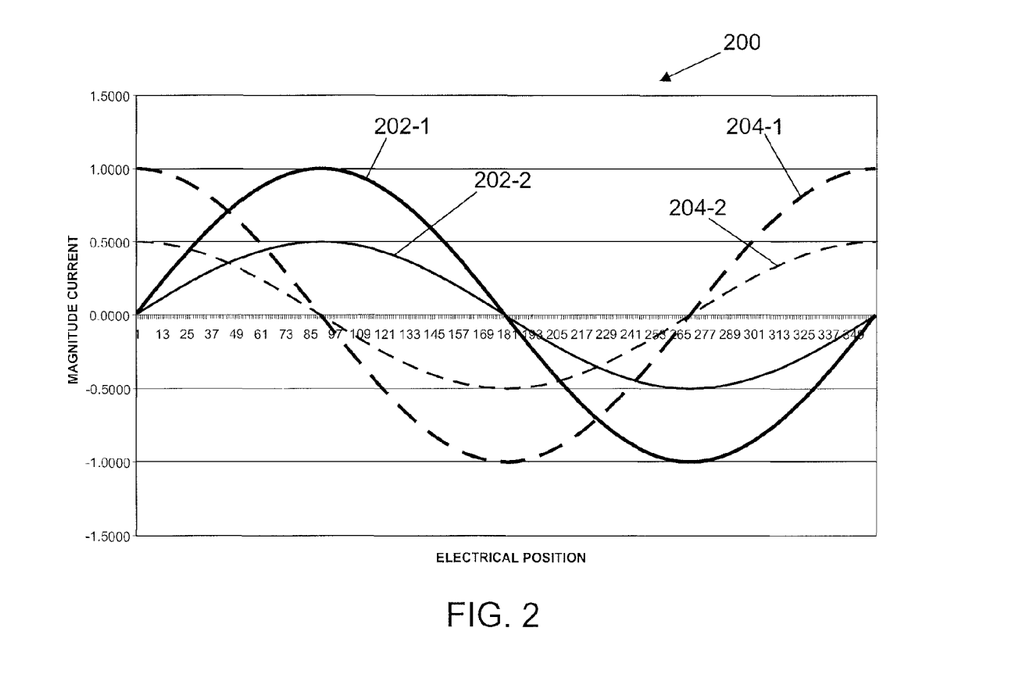
FIG. 2 is a plot depicting the winding currents for the two winding, continuously commutated DC motor at both maximum positive output torque and half maximum positive output torque, and using the known algorithms to calculate the current.

The sine currents 202-1, 202-2 and the cosine currents 204-1, 204-2 for two different torque commands are graphically depicted in FIG. 2. The two torque commands are a full torque command and a half-torque command. It should be noted that the winding currents, though continually varying with position, are continuous with no abrupt step changes. Also, the phase of each winding current does not change when the winding current magnitude changes.

The output torque of the two-phase motor described above (e.g, T(motor)) is equal to the sum of the individual winding torques (e.g., T(sine), T(cosine)), as shown in the following equation (5):

$$T(\text{motor}) = T(\text{sine}) + T(\text{cosine}). \qquad (\text{EQ-5})$$

The sine winding torque and the cosine winding torque are each equal to the product of its associated winding torque constant and winding current. Thus, the sine winding torque and the cosine winding torque are mathematically described by equations (6) and (7), respectively:

$$T(\text{sine}) = K^* \text{Sin}(AX)^* I^* \text{Sin}(AX) \qquad (\text{EQ-6})$$

$$T(\text{cosine}) = K^* \text{Cos}(AX)^* I^* \text{Cos}(AX). \qquad (\text{EQ-7})$$

It is noted that by using the trigonometric identity of equation (8) below in equation (5), the motor output torque (T(motor)) is proportional to the product of the peak winding current magnitude (I) and the torque constant (K), as represented in equation (9):

$$\text{Sin}(AX)^* \text{Sin}(AX) + \text{Cos}(AX)^* \text{Cos}(AX) = 1, \qquad (\text{EQ-8})$$

$$T = I^* K. \qquad (\text{EQ-9})$$

Figure 3:
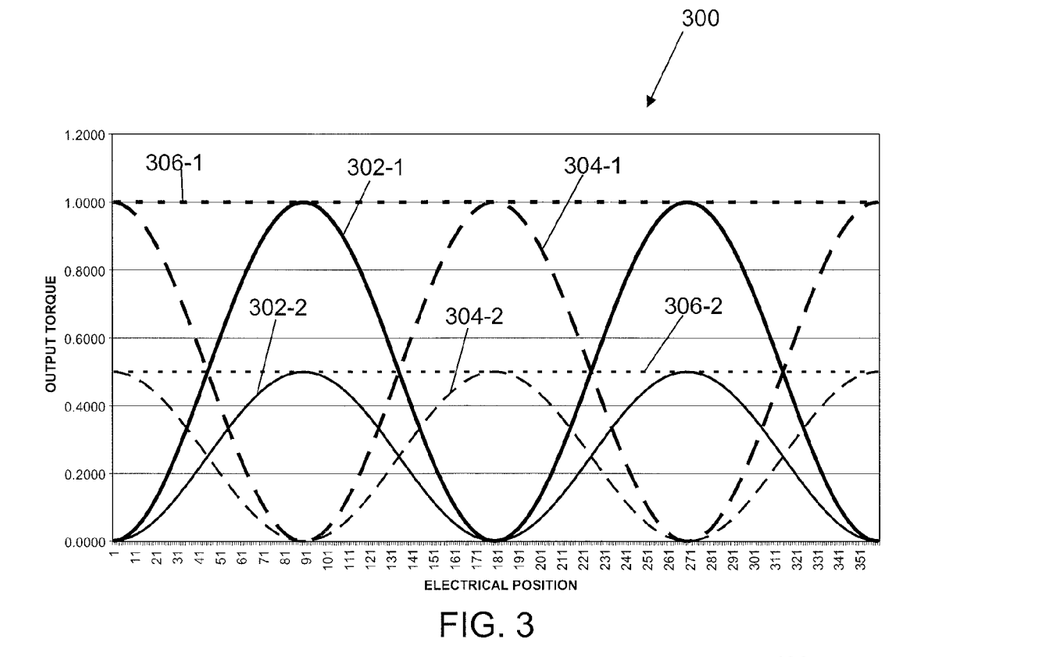
FIG. 3 is a plot depicting the resulting output torque of each winding and the total motor output torque for the two winding, continuously commutated DC motor at both maximum positive output torque and half maximum positive output torque, and using the known algorithms to calculate the current.

For clarity and completeness of depiction and description, FIG. 3 graphically depicts the sine winding torques 302-1, 302-2 (e.g., T(sine)), the cosine winding torques 304-1, 304-2 (e.g., T(cosine)), and the total motor torques 306-1, 306-2 (e.g., T(motor)), for the full torque command and half-torque command. In addition, FIG. 4 graphically depicts the sine winding current 402 (e.g., I*Sin(X)) and the cosine winding current 404 (e.g., I*Cos(X)) for a system where the motor position is changing at a constant rate and the total motor torque 406 (e.g., T(motor)) is varying.

Figure 5:
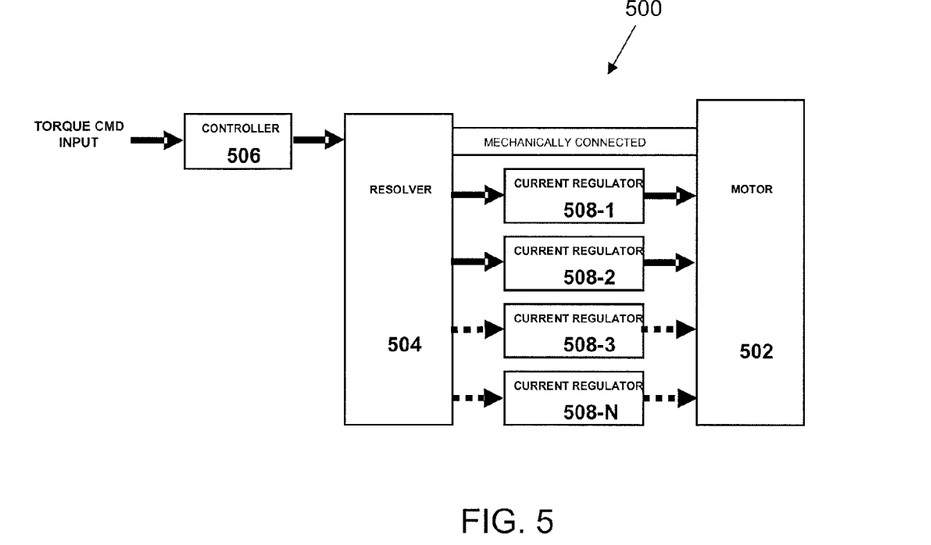
FIG. 5 is a block diagram depicting a heritage analog motor drive system.

Referring now to FIG. 5, a block diagram is depicted of a heritage analog drive system 500. The depicted drive system 500 includes a motor 502, a controller 504, a resolver 506, and a plurality of current regulators 508 (e.g., 508-1, 508-2, 508-3, ... 508-N). The motor 502 is a multi-phase (e.g., N-phases) discretely commutated DC motor. The controller 504 is adapted to receive a torque command and is operable, in response to the torque command, to supply an analog drive signal to drive the resolver 504. The resolver 506 is mechanically coupled to the motor 502, and is responsive to the analog drive signal supplied from the controller 504 to supply current commands for each winding. In particular, the resolver 506 multiplies the analog drive signal by the motor position to generate the current commands for each winding. Each current command is supplied to one of the current regulators 508. Each current regulator 508 is associated with each of motor winding and, in response to the current command it receives, supplies the commanded current to its associated motor winding, which in turn produces the desired output torque. It is noted that in this configuration the controller 504 implements the portion of the above-described current algorithms that scale the winding currents (I) to the winding torques (T), and the resolver 506 implements the portion of the above-described current algorithms that multiply the currents by sin (AX) or cosine(AX).

Figure 6:
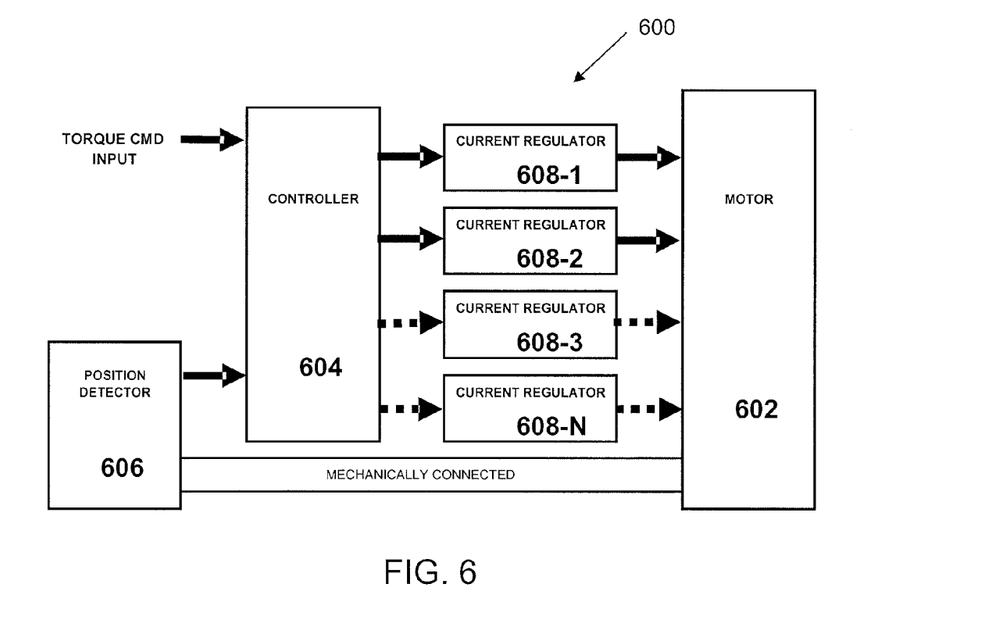
FIG. 6 is a block diagram depicting a heritage digital motor drive system that may also be configured to implement an embodiment of the present invention.

Referring now to FIG. 6, a block diagram of a heritage digital drive system 600 is depicted and will now be described. The drive system 600 includes a multi-phase discretely commutated DC motor 602, a controller 604, a position detector 606, and a plurality of current regulators 608 (e.g., 608-1, 608-2, 608-3, ... 608-N). The controller 604, like the system depicted in FIG. 5 and described above, is adapted to receive a torque command. However, unlike the previously described system 500, the controller 604 does not drive a resolver. Rather, the controller 604 directly drives each of the current regulators 608, and thus includes an output associated with each current regulator 608. More specifically, the controller 604, in addition to being adapted to receive the torque command, is coupled to receive a position signal from the position detector 606. The position signal is representative of the mechanical position of the motor's rotor relative to its stator. The controller 604 is configured to convert the mechanical position to the electrical position of each winding. The controller 604 is further configured to multiply the electrical position of each winding by the received torque command to determine a winding current command for each winding. The determined winding current commands are in turn supplied to the appropriate current regulators 608.

The current regulators 608 are each coupled to receive the appropriate winding current commands from the controller 604. Each current regulator 608, in response to the winding current commands it receives, drives its associated motor winding to produce the commanded torque. It is noted that in this configuration, the controller 604 implements those portions of the previously-described current algorithm that scale the winding currents (I) to the winding torques (T) and multiply the currents by sin(AX) or cosine(AX).

Before proceeding further it is noted that the position detector 606 may be any one of numerous known devices for detecting the mechanical position of the motor's rotor relative to its stator. For example, the position detector 606 may be a resolver, as in the previously-described analog system 500, or it may be any one of numerous optical sensors, a Hall effect sensor, various other magnetic-based sensors, or various resistance-based sensors, just to name a few.

It was noted in the background section that two different methods of widening the range while maintaining the resolution in a motor drive control system have been identified. These two methods were: (1) either reduce the ground floor noise sufficiently or (2) add a second motor in parallel that is scaled to operate over a lower torque range and then mesh the two motor performances together. The first method, reducing the ground floor noise, has been worked for years, and significant advances are not easily made. The present invention uses the second method, adding a second motor in parallel, but without physically adding an additional, second motor.

A multi-phase motor (e.g., a motor with multiple windings) can be considered several motors, by considering each of the windings as a separate motor. Thus, a two-phase motor may be considered as two motors. It is noted, however, that a two-phase motor, with each phase having 12-bits of resolution on its current, has as many as 24-bits of resolution dependent on motor position. Hence, an algorithm that takes advantage of all, or at least a greater number of, the possible current combinations is needed. The inventor of the instant invention has determined that the algorithm that provides sufficiently high resolution is a phase shift algorithm.

With the phase shift algorithm, all of the motor winding currents are phase shifted the same amount (Y) to change the output torque. Thus, for the two-phase motor, the sine winding current and the cosine winding current are mathematically described by (10) and (11), respectively:

$$I(\text{sine}) = I^* \text{Sin}(AX - Y) \tag{EQ-10}$$

$$I(\text{cosine}) = I^* \text{Cos}(AX - Y). \tag{EQ-11}$$

Figure 7:
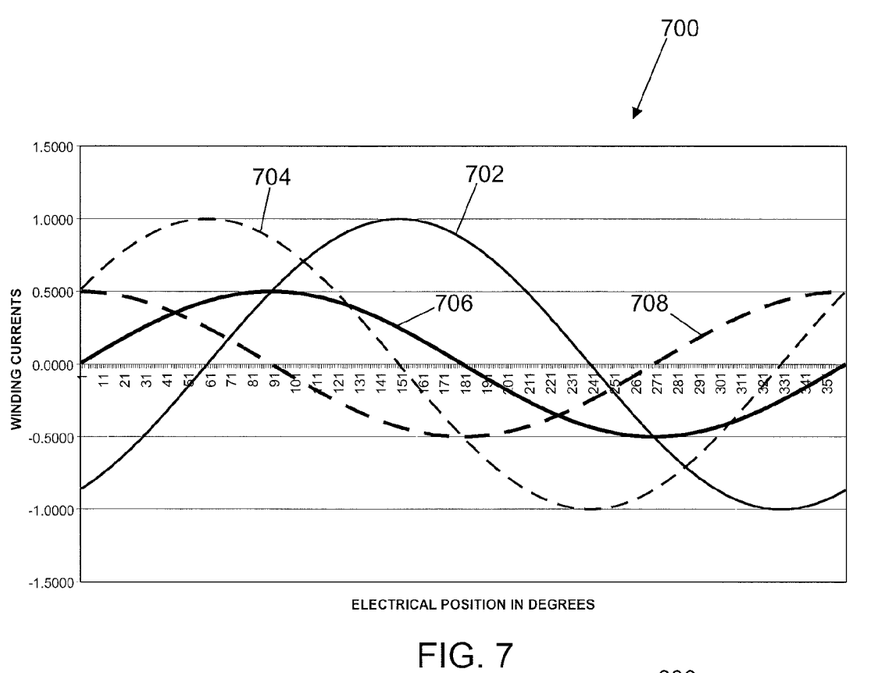
FIG. 7 is a plot depicting the winding currents for the two winding, continuously commutated DC motor at half maximum positive output torque using both the phase shift algorithm of the present invention and presently known algorithms to calculate the currents.

The sine winding current 702 and the cosine winding current 704 for a half-torque command using the phase shift algorithm are graphically depicted in FIG. 7. For comparison purposes, the sine winding current 706 and the cosine winding current 708 for the half-torque command using the heritage algorithm previously described is also graphically depicted in FIG. 7. It is seen that whereas the sine 706 and cosine 708 winding currents using the heritage algorithm are half-magnitude currents, the sine 702 and cosine 704 winding currents using the phase shift algorithm remain full magnitude currents, just phase shifted 60 electrical degrees.

The output torque of the motor, as previously described, is equal to the sum of the individual winding torques, and is thus mathematically described by equation (12):

$$T(\text{motor}) = K^* \text{Sin}(AX)^* I^* \text{Sin}(AX - Y) + K^* \text{Cos}(AX) \\ {}^* I^* \text{Cos}(AX - Y). \tag{EQ-12}$$

Again, using known trigonometric identities, equation (12) reduces to equation (13):

$$T(\text{motor}) = K^* I^* \text{Cos}(-Y). \tag{EQ-13}$$

Figure 8:
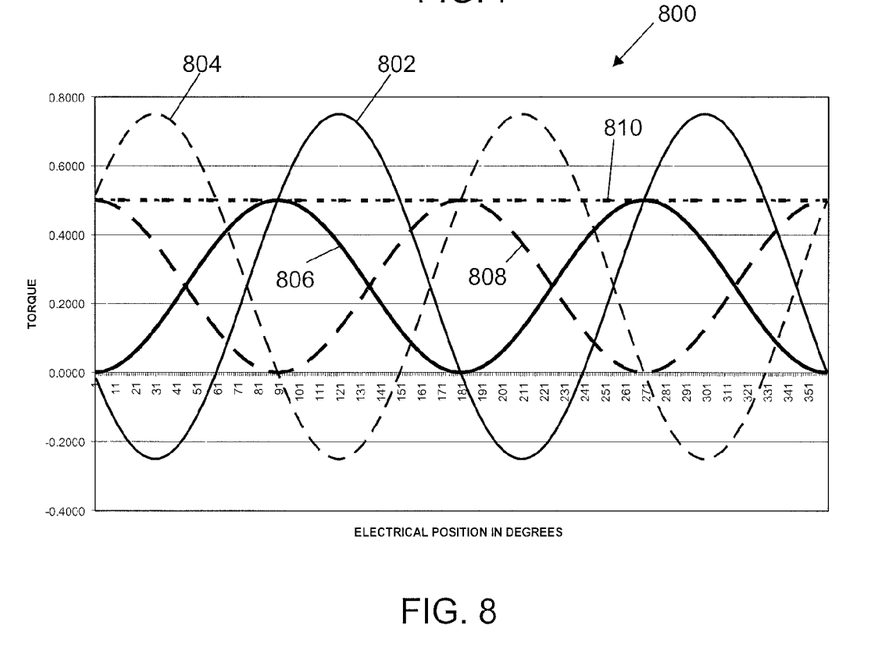
FIG. 8 is a plot depicting the resulting output torque of each winding and the total motor output torque for the two winding, continuously commutated DC motor at half maximum positive output torque, and using both the phase shift algorithm of the present invention and the known algorithms to calculate the current.

The sine winding torque 802 (T(sine)), the cosine winding torques 804 (e.g., T(cosine)), and the total motor torque 806 (T(motor)) for the half-torque command 810 using the phase shift algorithm are graphically depicted in FIG. 8. Also for comparison purposes, the sine winding torque 806 and the cosine winding torque 808 for the half-torque command using the heritage algorithm is also graphically depicted in FIG. 8.

Figure 4:
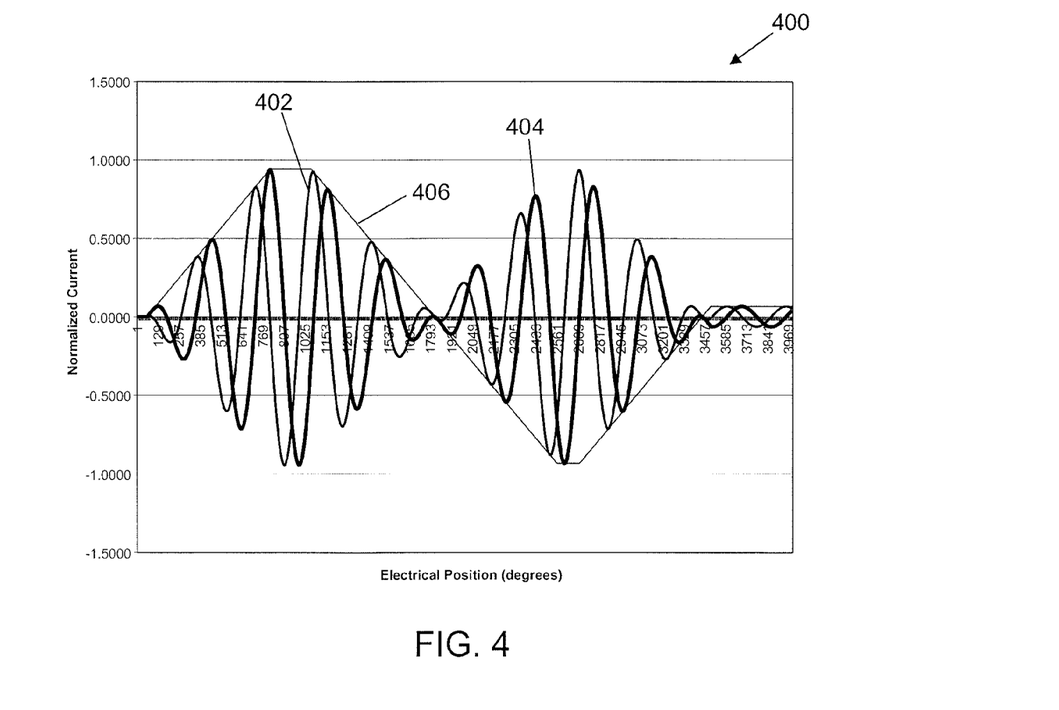
FIG. 4 is a plot depicting the winding currents for the two winding, continuously commutated DC motor in which the motor position is changing at a constant rate and the total motor torque is varying.
Figure 9:
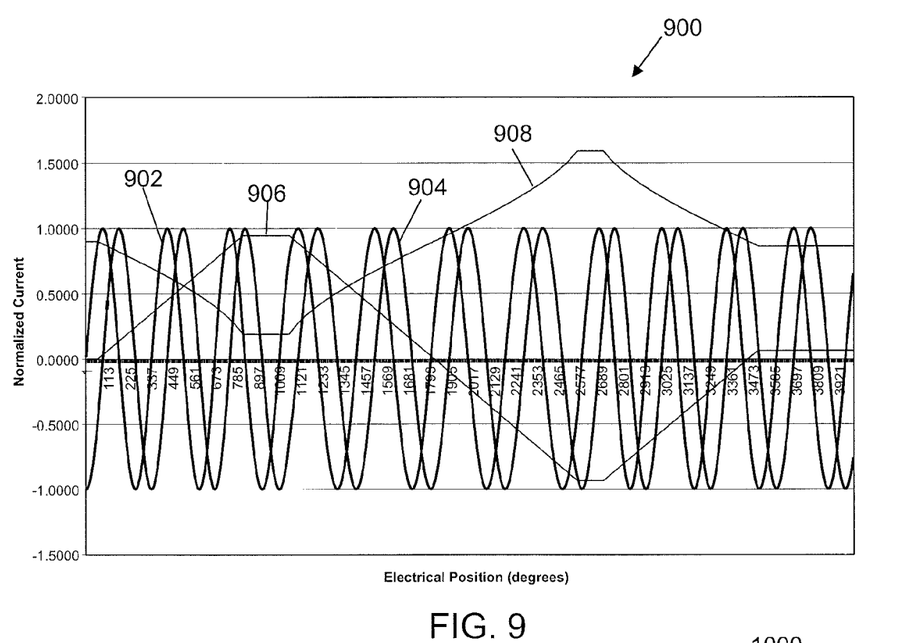
FIG. 9 is a plot depicting the winding currents for the two winding, continuously commutated DC motor for the same torque/position profile of FIG. 4, but using the phase shift algorithm of the present invention to calculate the current.

Referring now to FIG. 9, depicted therein is an example of the sine 902 and cosine 904 winding currents versus position, for the same torque/position profile depicted in FIG. 4, and using the phase shift algorithm. It is noted that to acheive the same torque 906, the peak amplitudes of the sine 902 and cosine 904 winding currents remain constant (e.g., at M), but the phase shift 908 varies. It is further noted that in FIG. 9, the plotted phase shift 908 is the actual phase shift divided by 100.

The phase shift algorithm was described above in the context of controlling the output torque of a two-phase motor. It will be appreciated, however, that the phase shift algorithm may be extended to three-phase, four-phase, and various other multi-phase motors. To illustrate this, the output torque for a three-phase motor and for a four-phase motor may be described by equations (14) and (15), respectively:

$$T = 1.5^* I^* K^* \text{Cos}(Y) \tag{EQ-14}$$

$$T = 2^* I^* K^* \text{Cos}(Y). \tag{EQ-15}$$

It will additionally be appreciated that as the number of phases increases, the number of potential torque levels for the phase shift algorithm to draw from concomitantly increases.

From the above description, it is seen that when the phase shift algorithm is used for torque control, the winding current magnitude (I) remains constant at the maximum value. Thus, power dissipation can be relatively high when the phase shift algorithm is used. To address this potential drawback, the inventor of the instant invention has developed and an additional operational control scheme. With this additional operational control scheme either the winding current magnitude (I) is alone adjusted to control torque, or the phase shift algorithm is implemented and winding current magnitude (I) and the phase shift (Y) are both adjusted to control torque. A drive system that implements this control scheme is preferably configured to determine whether to selectively implement the phase shift algorithm. The determination of whether to implement the phase shift algorithm may be accomplished in response to an external command or autonomously.

Figure 10:
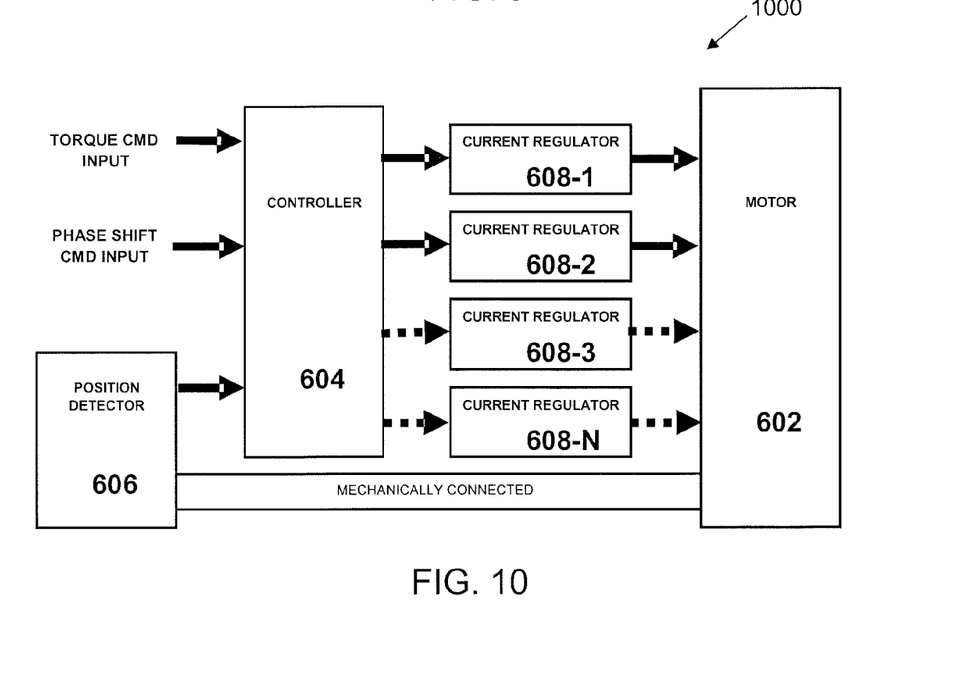
FIG. 10 depicts a functional block diagram of an exemplary digital motor drive system in accordance with an embodiment of the present invention.
Figure 11:
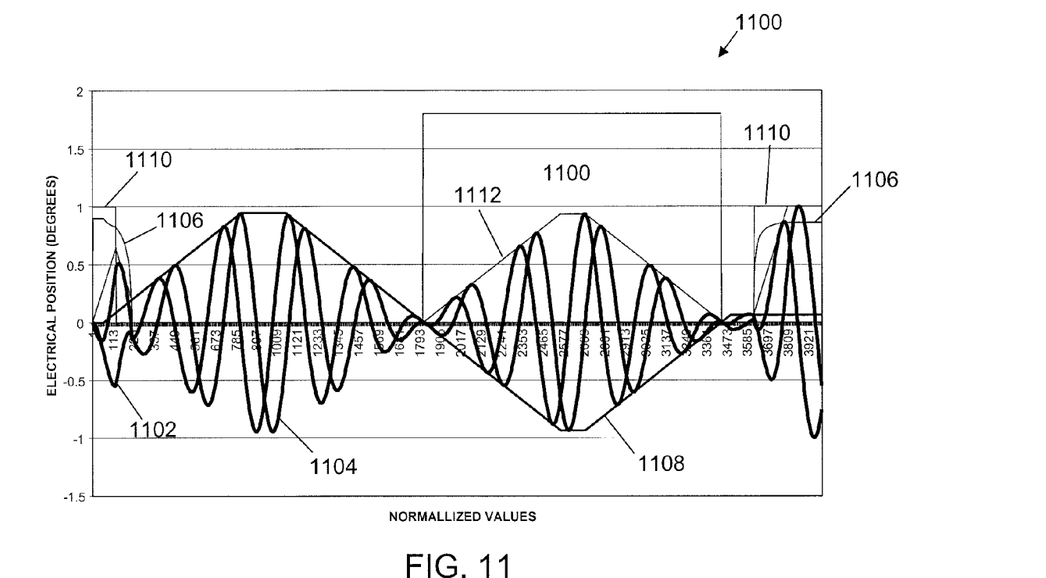
FIG. 11 is a plot depicting the winding currents for the two winding, continuously commutated DC motor in a system that automatically uses the known algorithms to calculate the currents for torque magnitudes above a threshold value and uses the phase shift algorithm of the present invention for torque magnitudes below the threshold value.

A block diagram of a drive system configured to selectively implement the phase shift algorithm in response to an input command is depicted in FIG. 10. The drive system 1000 depicted in FIG. 10 is substantially identical to the system 600 depicted in FIG. 6 and described above. Thus, a detailed description of each of the functional blocks, which are represented using like reference numerals in FIG. 6, will not be provided. One difference, however, is that the drive system 1000 selectively implements the phase shift algorithm. Specifically, the system 1000 selectively implements the phase shift algorithm in response to a phase shift command.

Figure 12:
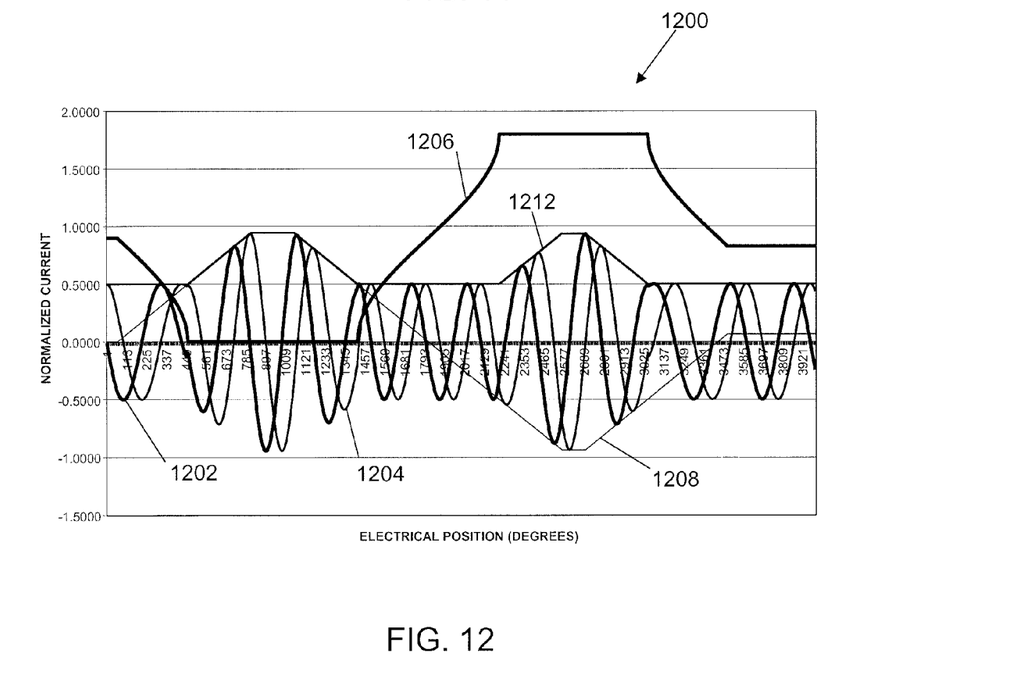
FIG. 12 is a plot depicting the winding currents for the two winding, continuously commutated DC motor in a system that is responsive to an input command to use either the known algorithms or the phase shift algorithm of the present invention to calculate the currents.

The sine winding current 1102, the cosine winding current 1104, the phase shift 1106, and the torque 1108 in the above-described system 1000 is depicted in FIG. 12. As may be readily apparent, the system 1000, in response to the input command 1110, adjusts the torque 1108 by either implementing the known algorithm (i.e., adjusting the peak magnitude 1112 of the winding currents 1102, 1104) or the phase shift algorithm (i.e., adjusting the phase 1108 of the winding currents 1102, 1104). In the depicted plot 1100, the system 1000 adjusts the torque 1108 by adjusting the phase 1112 of the winding currents 1102, 1104 if the input command 1110 is at a logical "1", and adjusts the torque 1110 by adjusting the magntidue of the winding currents 1102, 1104 if the input command 1110 is at a logical "0". It is noted that the same torque/position profile depicted in FIGS. 4 and 9 is used here. The system 1000 starts with input command 1110 at a logical "1". The input command 1110 is then changed a logical "0" for a relatively large torque manuever, before returning to a logical "1" near the end of the plot 1100, when the torque 1110 is relatively low. It is noted that the system 1000 preferably implements a smoothing function to limit the rate of change in peak winding current magnitude when the input command 1110 switches states.

An autonomous system, which is preferably implemented using the system depicted in FIG. 10 but without the phase shift command input, is preferably configured to keep the phase (Y) at zero unless the commanded torque is below a predetermined magnitude. The system then provides the low level torques by implementing the additional phase shift control. Preferably, the autonomous system is configured to calculate two parameters associated each winding current command, the winding current (I(X)) and the winding current angle (Y). The system is also preferably configured to automatically implement the additonal phase shift control for winding currents below a given peak winding current magnitude (M). Thus, if the torque command results in a winding current I(X)>M, then the winding current for each winding is commanded to the associated value of I(X) and the phase shift (Y) is zero. Similarly, if the torque command results in a winding current I(X)<−M, then the winding current for each winding is commanded to the negative of the calculated I(X) and phase shift (Y) is set to 180 degrees. If, however, the torque command results in a winding current between M and −M (e.g., M≧I(X)≧−M), then the winding current for each winding is commanded to M and the phase shift (Y) is set to a value that is calculated by dividing I(X) by M and then taking the arc-cosine of this quotient.

The sine winding current 1202, the cosine winding current 1204, the phase shift 1206, and the torque 1208 in the above-described autonomous system is depicted in FIG. 12. As is readily seen, the system uses the known algorithms to calculate winding currents 1202, 1204, and thus adjusts the gain (e.g., the peak magnitude 1212 of the winding currents 1202, 1204), for torque magnitudes 1208 above 50% of full torque. However, for torque magnitudes 1208 less than 50% of full torque, the system uses the phase shift algorithm to calculate the winding currents 1202, 1204.

It will be appreciated that in some embodiments the above-described command and autonomous paradigms could be combined in a single system. In such a system, for example, the phase shift algorithm may be used only at relatively low current command levels, while the input command may be used to allow an increase in the value of current being used.

The systems and methods described herein may be used to control a multi-phase motor or multi-phase motor driven actuator. The systems and method increase the control resolution of the multi-phase motor or multi-phase motor driven actuator, allowing for a wider torque output range.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for controlling the torque produced by a multi-phase DC motor, each phase of the multi-phase DC motor including a phase winding having a torque constant, the method comprising the steps of:
   determining a drive current to be supplied to each phase winding to produce a desired torque magnitude, the determined drive currents each including a peak amplitude and a phase angle;
   supplying the drive current to each phase winding; and
   at least selectively varying the phase angle of each drive current and at least selectively varying the peak amplitude of each drive current to produce the desired torque magnitude.

2. The method of claim 1, further comprising:
   maintaining the peak amplitude of each drive current at least substantially constant when varying the phase angle of each drive current.

3. The method of claim 1, further comprising:
   determining if the desired torque magnitude is less than a predetermined torque value; and
   varying the phase angle of each drive current in response to determining that the desired torque magnitude is less than the predetermined torque value.

4. The method of claim 1, further comprising:
   determining if an input command has been received; and
   varying the phase angle of each drive current if the input command has been received.

5. The method of claim 1, further comprising:
   determining if a predetermined event has occurred; and
   varying the phase angle of each drive current in response to determining that the predetermined event has occurred.

6. The method of claim 5, further comprising:
   determining if the desired torque magnitude is less than a predetermined torque value,
   wherein the predetermined event is determining that the desired torque magnitude is less than the predetermined torque value.

7. The method of claim 5, further comprising:
   determining if an input command has been received,
   wherein the predetermined event is determining that the input command has been received.

8. The method of Claim 1, further comprising:
   maintaining the phase angle of each drive current at least substantially constant when varying the peak amplitude of each drive current.

9. A motor drive control system, comprising:
   a multi-phase DC motor, each phase of the multi-phase DC motor including a phase winding having a torque constant, the multi-phase DC motor responsive to a drive current supplied to each phase winding to produce a torque; and
   a controller adapted to receive a torque command representative of a desired torque magnitude to be produced by the multi-phase DC motor, the controller responsive to the torque command to determine a winding current command for each phase winding that:
   (i) is representative of the drive current to supply to each phase winding to produce the desired torque magnitude, each drive current including a peak amplitude and a phase angle, and
   (ii) at least selectively varies the phase angle of the drive current to supply to each phase winding and at least selectively vary the peak amplitude of each drive current to produce the desired torque magnitude.

10. The system of claim 9, further comprising:
    a plurality of current regulators, each current regulator coupled between the controller and one of the phase windings and responsive to one of the winding current commands for each phase to drive its associated phase winding to produce the desired torque magnitude.

11. The system of claim 9, wherein:
    the multi-phase DC motor includes a rotor and a stator;
    the controller is coupled to receive a position signal representative of rotor position relative to the stator; and
    the controller is further responsive to the position signal to determine the winding current command for each phase winding.

12. The system of claim 11, wherein:
    the rotor position relative to the stator is a mechanical position;
    each phase winding has an electrical position;
    the controller is responsive to the position signal to convert the mechanical position to the electrical position of each phase winding; and
    the controller determines the winding current command for each phase winding by multiplying the electrical position of each phase winding by the torque command.

13. The system of claim 11, further comprising:
a position detector coupled between the multi-phase DC motor and the controller and configured to sense the rotor position relative to the stator and supply the position signal to the controller.

14. The system of claim 9, wherein the winding current command for each phase winding results in the peak amplitude of each drive current being maintained at least substantially constant when the phase angle of each drive current is varied.

15. The system of claim 9, wherein:
the controller is further configured to determine if the desired torque magnitude is less than a predetermined torque value; and
if the desired torque magnitude is less than the predetermined torque value, the winding current commands that the controller determines for each phase winding vary the phase angle of each drive current.

16. The system of claim 9, further comprising:
the controller is further adapted to selectively receive an input command and is further configured, upon receipt of the input command, to determine winding current commands for each phase winding that vary the phase angle of each drive current.

17. The system of claim 9, wherein:
the controller is further configured to determine if a predetermined event has occurred; and
if the predetermined event has occurred, the winding current commands that the controller determines for each phase winding vary the phase angle of each drive current.

18. The system of claim 17, wherein the predetermined event is determining that the desired torque magnitude is less than a predetermined torque value.

19. The system of claim 17, wherein:
the controller is further adapted to selectively receive an input command; and
the predetermined event is determining that the input command has been received.

20. The system of Claim 9, wherein the winding current command that the controller determines for each phase winding maintains the phase angle of each drive current at least substantially constant when the peak amplitude of each drive current varies.

* * * * *